# United States Patent Office 3,273,804
Patented Sept. 20, 1966

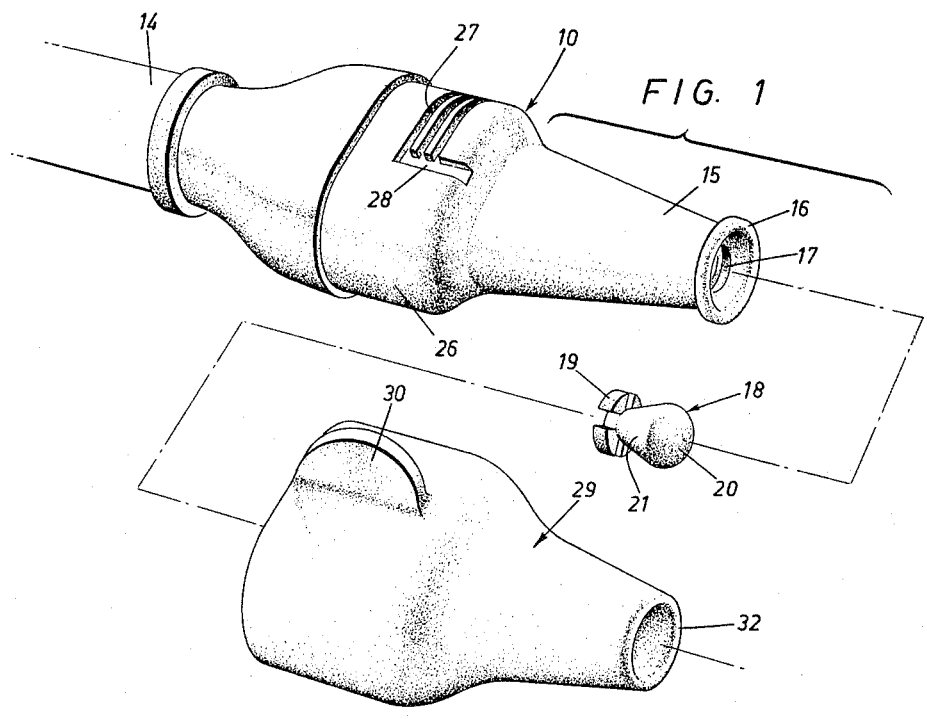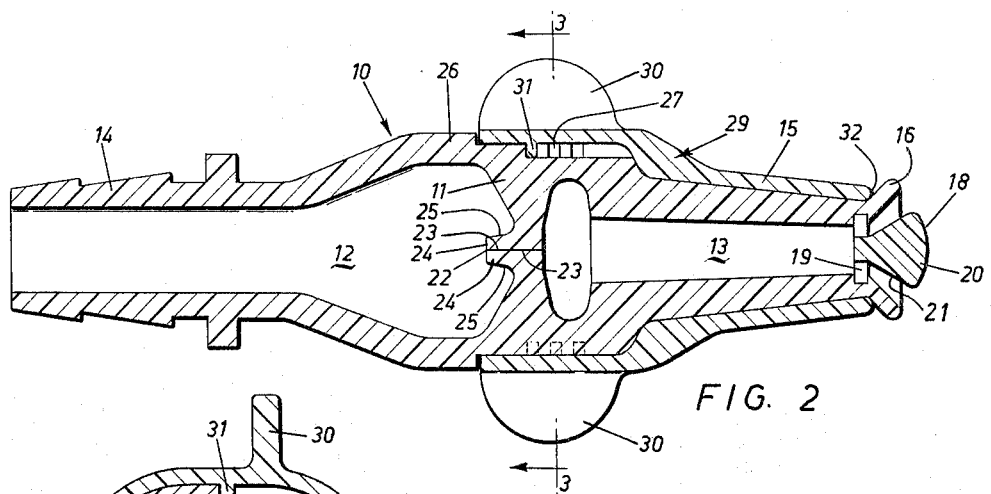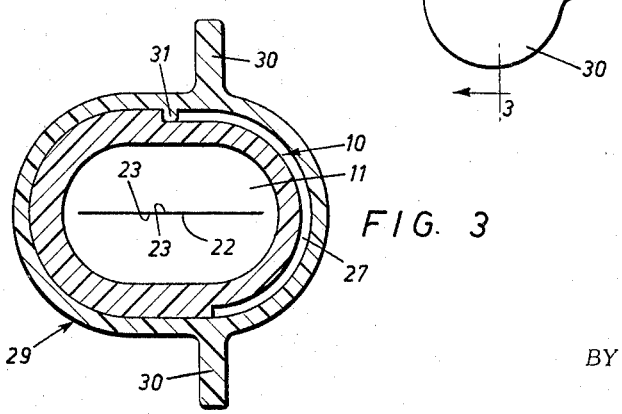

3,273,804
VALVE
Wilfred W. Wilson, Woodbridge, Ontario, Canada, assignor to The Amara Company Limited, Ontario, Canada
Filed Dec. 9, 1964, Ser. No. 417,008
12 Claims. (Cl. 239—569)

This invention relates to a valve. More particularly, this invention relates to a valve adapted to control the flow of a fluid such as water and having as few as two parts. This invention also relates to a nozzle having such a valve incorporated therein.

While this invention will be disclosed in detail hereinafter in connection with the provision of an improved nozzle, for use with a garden hose, for example, it will be appreciated that a valve embodying this invention, and which forms a part of such a nozzle, has a much wider field of use. Consequently, the specific description of a valve embodying this invention in connection with the provision of a new and useful nozzle is intended to be illustrative only rather than limiting.

The valve members of conventional valves commonly are connected to a valve member actuator which passes through the housing of the valve. Packing material or sealing rings are provided to prevent leakage of fluid between the housing and valve member actuator. From time-to-time it is necessary to replace this packing material or other sealing devices or fluid leakage may result.

In accordance with this invention, there is provided a valve which requires no packing material or sealing devices and in which the valve member actuator does not pass through the valve housing to operate a valve member.

Other features of a valve embodying this invention include simplicity of construction and assembly, the valve having as few as two parts, and self-sealing when the valve member is under fluid pressure on the inlet side thereof.

In brief, in accordance with one aspect of this invention there is provided a valve which includes a housing defining a chamber through which a fluid may be passed. A valve member is positioned within and extends across the chamber. The valve member is adapted to control the flow of fluid through the chamber and comprises a deformable wall that has a slit extending therethrough. This slit communicates with the chamber on both sides of the deformable wall and is itself defined by facing surfaces. Means are provided which are actuable by the pressure of the fluid in the chamber for holding the facing surfaces of the slit together, so that when such means are under the influence of fluid pressure, the slit in the deformable wall is normally closed. Means also are provided for distorting or deforming the deformable wall against the influence of any such fluid pressure to open the slit and permit passage of fluid through the valve.

This invention and its attendant advantages will become more apparent from the following detailed disclosure, taken in conjunction with the appended drawings, in which:

FIGURE 1 is an exploded perspective view of a nozzle embodying this invention employing a valve embodying this invention;

FIGURE 2 is a section along the longitudinal axis of the nozzle of FIGURE 1 with the parts thereof in assembled relation; and FIGURE 3 is a section along line 3—3 in FIGURE 2.

Referring to the three drawings, there is shown a nozzle having a housing 10 that defines a chamber which is separated by a wall 11 into an inlet chamber 12 and an outlet chamber 13.

At the inlet end of the nozzle, housing 10 is in the form of a conventional connector 14 for insertion into a hose, pipe or the like, but the form of connector 14 or, for that matter, the inlet end of housing 10 is not a material consideration affecting this invention.

The outlet end of housing 10 is in the form of a hollow truncated cone 15 that terminates in an outwardly directed flange 16 also in the configuration of a hollow truncated cone.

Mounted in an annular groove 17 on the inside of cone 15 adjacent flange 16 is a deflector 18. The latter consists of a slotted plate 19 having a deflecting cone 20 formed integral therewith and projecting therefrom. Cone 20 has an outwardly directed, conical, deflection surface 21.

Wall 11 is formed integral with housing 10 and extends across the chamber defined by housing 10 separating it into an inlet chamber 12 and an outlet chamber 13, as aforementioned. Wall 11 actually constitutes the valve member of the nozzle, as will become more apparent hereinafter.

Centrally disposed in wall 11 and extending completely therethrough so as to communicate with both chambers 12 and 13 is a slit 22 that is defined by two facing surfaces 23.

It will be noted that wall 11 is formed on the inlet side thereof with lips 24 adjacent slit 22. These lips project into inlet chamber 12 and provide surfaces 25 on which fluid under pressure in inlet chamber 12 can exert a force.

The part 26 of housing 10 between parts 14 and 15 thereof and adjacent wall 11 is generally ellipsoidal in cross-section. It is provided with a plurality of spaced-apart, grooves 27 that extend part way around the circumference of part 26 and which are connected by a connecting groove 28.

Mounted on parts 15 and 26 of housing 10 is a valve member actuator 29 having an inner surface that conforms to the shape of these parts, so that the inner surface of actuator 29 opposite part 26 is ellipsoidal in cross-section and touches the outer surface of part 26 when the actuator is mounted on the housing in the position shown in FIGURE 2.

Tabs 30 extend outwardly from the main body portion of actuator 29 to provide means whereby the actuator may be manually rotated on housing 10.

Referring to FIGURE 2, actuator 29 has an inwardly projecting finger 31 that extends into grooves 27 or 28 when the actuator is mounted on housing 10. It also will be noted that when finger 31 is in the groove 27 closest to the inlet side of the nozzle, the end 32 of actuator 29 adjacent flange 16 just engages this flange.

Housing 10 and wall 11 preferably are formed integral with each other, but this is not essential. It is important, however, that wall 11 and part 26 of housing 10 be composed of a deformable material. To this end housing 10 (including flange 16) and wall 11 may be formed from silicone rubber or a polyurethane, for example. Actuator 29, on the other hand, should be quite rigid and may be of a rigid plastic material or suitable metal, e.g., zinc.

In order to assemble a nozzle embodying this invention, actuator 29 is slipped over the outlet end of the nozzle, with finger 31 being aligned with groove 28 so as to slide therein. Flange 16 is deflected or deformed inwardly towards deflector 18 by the inner surface of cone 15 during the assembly of the parts until, when the parts are in the position of FIGURE 2, flange 16 springs back to the position thereof shown in FIGURE 2. Deflector 18 may be inserted into its groove 17 prior to or following the foregoing operation.

The valve, which comprises housing 10 and wall 11 with its slit 22, of the nozzle is closed in FIGURES 2 and 3. If there is fluid pressure in inlet chamber 12, a force is exerted on surfaces 25 of lips 24 which forces facing surfaces 23 together, positively closing slit 22 and preventing fluid from passing from inlet chamber 12 to outlet chamber 13. However, when tabs 30 are grasped and actuator 29 rotated with finger 31 travelling in one of grooves 27, the actuator causes deformation or distortion of part 26 and wall 11, which causes slit 22 to open to permit fluid to pass from inlet chamber 12 to outlet chamber 13. The distortion or deformation of part 26 and wall 11 is due to the compressive effect of actuator 29 on the sides of part 26, i.e. the portions of part 26 adjacent the major axis thereof. This effect is greatest when actuator 29 is rotated 90° from the position thereof shown in FIGURE 2. In the 90° position the major and minor axes of actuator 29 and part 26 are at right angles, and the sides of part 26 are deformed inwardly the maximum amount. The position of actuator 29 relative to part 26 thus determines the degree of opening of slit 22, and hence the amount of fluid that can pass through the slit at any given pressure. At any given pressure the volume of fluid passing through the slit therefore can be varied in increments from zero flow to full flow.

The form of the spray of water or the like emanating from the nozzle is determined by the spacing between flange 16 and surface 21. In order to vary the spray, actuator 29 should be moved to the right in FIGURE 2 with finger 31 travelling in slot 28. This movement results in end 32 of actuator 29 forcing flange 16 towards deflector 18, thereby changing the gap between flange 16 and surface 21. This gap remains the same during rotation of actuator 29 with finger 31 travelling in any given one of grooves 27 but varies from groove to groove. When actuator 29 is moved from its right-hand to its left-hand position in FIGURE 2, flange 16, being resilient, returns to the position thereof shown in FIGURE 2.

It will be seen from the foregoing that a nozzle embodying this invention incorporates both flow rate and spray control, although the latter may be omitted if desired.

It will be understood that in a valve emodying this invention parts 14 and 15 may be simply tubes, and that the part of actuator 29 from the right-hand side of tabs 30 in FIGURE 2 to end 32 may be dispensed with.

Means other than actuator 29 may be employed to deform part 26 and wall 11. For example, a clamp may be used to force the sides of housing 26 towards each other. Furthermore, part 26 and the portion of actuator 29 adjacent this part need not be ellipsoidal. If a rotatable actuator is employed, all that is required is that the shape of part 26 and the actuator be such that in one position of the two components there is no deformation of part 26, while there is deformation thereof in at least one other position of the components. This is most advantageously carried out by designing part 26 to have one major dimension, e.g. width, greater than another major dimension, e.g. height, and shaping the portion of the actuator which is mounted on part 26 to conform to the shape of part 26. Part 26 and the portion of actuator adjacent thereto both could be rectangular, for example. It should be noted, however, that the portion of the actuator which causes deformation of part 26 need not necessarily be the same shape as that of part 26. Since actuator 29 does not extend through housing 10 to engage the valve member, it will be noted that no seals or packing materials are required.

While a preferred embodiment of this invention has been disclosed herein, those skilled in the art will appreciate that changes and modifications may be made therein without departing from the spirit and scope of this invention as defined in the appended claims.

What I claim as my invention is:

1. A valve comprising a housing, said housing defining a chamber through which a fluid may be passed, a valve member positioned within and extending across said chamber, said valve member being adapted to control the flow of fluid through the chamber defined by said housing and comprising a deformable wall having a slit extending therethrough, the slit in said deformable wall communicating on both sides of said deformable wall with the chamber defined by said housing and itself being defined by facing surfaces, means actuable by the pressure of fluid in the chamber defined by said housing for holding said surfaces together, whereby when said means are under the influence of such fluid pressure the slit in said deformable wall is normally closed; and means for deforming said deformable wall against the influence of such fluid pressure to open the slit in said deformable wall and permit fluid to pass through the slit in said deformable wall.

2. A valve according to claim 1 wherein said means actuable by the pressure of fluid in the chamber defined by said housing for holding said surfaces together comprise lip means projecting from said deformable wall into the chamber defined by said housing, said lip means being positioned adjacent the slit in said deformable wall.

3. A valve according to claim 1 wherein said housing has an inlet end and an outlet end, said valve member being interposed between said inlet and outlet ends, and wherein said means actuable by the pressure of fluid in the chamber defined by said housing for holding said surfaces together comprise lips projecting from said deformable wall into the part of the chamber defined by said housing on the inlet end side of said deformable wall, said lips being positioned adjacent the slit in said deformable wall on both sides of the slit in said deformable wall.

4. A valve according to claim 1 wherein the cross-sectional shape of the part of said housing adjacent valve member is such that one major dimension of said part of said housing is greater than another major dimension of said part of said housing, said part of said housing being deformable, and wherein said means for deforming said deformable wall comprise a rotatable member at least a portion of which is of substantially the same cross-sectional shape as the shape of said part of said housing, said portion of said rotatable member being mounted on said part of said housing for rotation on said part and in engagement with said part.

5. A valve member according to claim 4 wherein the cross-sectional shape of said part of said housing is generally ellipsoidal, and wherein said portion of said rotatable member is a generally ellipsoidally shaped ring.

6. A valve according to claim 4 wherein said housing has at least one channel extending at least part way around the outer periphery of said housing, said rotatable member having a finger projecting into said channel.

7. A valve according to claim 4 wherein said housing has a plurality of spaced-apart channels each extending at least part way around the outer periphery of said housing and a connecting channel connecting said spaced-apart channels, said rotatable member having a finger projecting into one of said channels and movable into different ones of said spaced-apart channels through said connecting channel.

8. A nozzle comprising a housing having an inlet end, an outlet end and defining chamber through which a liquid may be passed; a valve member positioned within and extending across said chamber, said valve member being adapted to control the flow of liquid through the chamber defined by said housing and comprising a deformable wall having a slit extending therethrough, the slit in said deformable wall communicating on both sides of said deformable wall with the chamber defined by said housing and itself being defined by facing surfaces, means actuable by the pressure of liquid in the chamber defined by said housing for holding said surfaces together, whereby when said means are under the influence of such liquid pressure the slit in said deformable wall is normally closed; a liquid deflector at the outlet end of said housing positioned in the path of liquid expelled from said nozzle; said housing having a resilient flange at the outlet end of said housing, said flange and said deflector defining therebetween an opening through which liquid is expelled from said nozzle; and actuator means rotatably and slidably mounted on said housing for deforming said deformable wall against the influence of such liquid pressure to open the slit in said deformable wall and permit liquid to pass through the slit in said deformable wall, said actuator means including means engageable with said flange for deflecting said flange towards said deflector when said actuator means is slid towards said flange to vary the size of the opening defined between said flange and said deflector.

9. A nozzle according to claim 8 wherein said means actuable by the pressure of liquid in the chamber defined by said housing for holding said surfaces together comprise lips projecting from said deformable wall into the chamber defined by said housing on the inlet side of said deformable wall, said lips being positioned adjacent the slit in said deformable wall on both sides of the slit.

10. A nozzle according to claim 8 wherein the cross-sectional shape of the part of said housing adjacent said valve member is such that one major dimension of said part of said housing is greater than another major dimension of said part of said housing, said part of said housing being deformable, and wherein the portion of said actuator means adjacent said part of said housing is of substantially the same cross-sectional shape as the shape of said part of said housing.

11. A nozzle according to claim 10 wherein the cross-sectional shape of said part of said housing is generally ellipsoidal, and wherein said portion of said actuator means is a generally ellipsoidally shaped ring.

12. A nozzle according to claim 9 wherein said housing has a plurality of spaced-apart channels each extending at least part way around the outer periphery of said housing and a connecting channel connecting said spaced-apart channels, said actuator means having a finger projecting into one of said channels and movable into different ones of said spaced-apart channels through said connecting channel.

No references cited.

EVERETT W. KIRBY, *Primary Examiner.*